United States Patent [19]

Ihara et al.

[11] Patent Number: 5,293,268
[45] Date of Patent: Mar. 8, 1994

[54] AUTOFOCUS LENS BARREL

[75] Inventors: Yuji Ihara, Kawasaki; Naoya Sugimoto, Yokohama, both of Japan

[73] Assignee: Nikon Corporation, Tokyo, Japan

[21] Appl. No.: 903,270

[22] Filed: Jun. 24, 1992

[30] Foreign Application Priority Data

Jul. 11, 1991 [JP] Japan .................. 3-196966

[51] Int. Cl.[5] .................... G02B 15/14; G02B 7/02
[52] U.S. Cl. .................... 359/704; 359/696; 359/823
[58] Field of Search .................. 359/694–706, 359/823, 676; 352/140; 355/309–316, 55–61; 354/99, 86

[56] References Cited

U.S. PATENT DOCUMENTS

| | | | |
|---|---|---|---|
| 3,324,780 | 6/1967 | Miyauchi | 359/704 |
| 4,303,320 | 12/1981 | Isono | 352/140 |
| 4,531,831 | 7/1985 | Kitajima et al. | 359/696 |
| 4,555,165 | 11/1985 | Negoro | 359/704 |
| 4,866,477 | 12/1989 | Barry et al. | 355/55 |
| 5,029,992 | 7/1991 | Richardson | 359/696 |
| 5,130,851 | 7/1992 | Shirie | 359/700 |
| 5,144,491 | 9/1992 | Oshino et al. | 359/676 |

Primary Examiner—Bruce Y. Arnold
Assistant Examiner—Thong Nguyen
Attorney, Agent, or Firm—Shapiro and Shapiro

[57] ABSTRACT

An autofocus lens barrel has an optical system shifter for shifting a focusing optical system forward and backward in the direction of the optical axis, a driven pulley rotatively driven around the optical axis for actuating the optical system shifter, and a driving pulley which is driven by receiving a driving force. The driving force is transmitted from the driving pulley to the driven pulley by means of a belt. Preferably, an idler pulley should be proved at a position substantially symmetrical to the driving pulley with respect to the optical axis, and the driving force is transmitted from the driving pulley to the driven pulley and the idler pulley by means of a belt.

4 Claims, 3 Drawing Sheets

AUTOFOCUS LENS BARREL

BACKGROUND OF THE INVENTION

1. Field of the Invention

The present invention relates to an autofocus lens barrel using a belt as a means of driving an autofocus lens.

2. Related Background Art

FIG. 3 is a cross-sectional view showing an example of a conventional autofocus lens barrel. In FIG. 3, a reference numeral 101 designates a lens mount; 102, a fixed barrel fixed to the lens mount 101; 103, a rotational barrel rotatively fitted along the internal periphery of the fixed barrel 102 with the optical axis as its center, and on the inner periphery of the rotational barrel 103, a helicoid 103b is formed while on the outer periphery of the lens mount 101, a segment gear 103a is formed. A reference numeral 104 designates a holding barrel having a helicoid 104a on the outer periphery thereof to engage with the helicoid 103b, at the same time, holding an optical system 110 with its inner periphery, and 114, a coupling shaft with a pinion gear 114a on the outer periphery thereof to engage with the segment gear 103a.

Subsequently, the description will be made of the operation of an autofocus lens barrel shown in FIG. 3. The driving force from a camera body (not shown) is transmitted to a coupling shaft (concave side) 114 provided for the mount 101 on the lens side through the coupling shaft (convex side, not shown) which is arranged on the mounting plane (not shown) on the body side. The driving force transmitted to the coupling shaft (concave side) 114 is transmitted to a rotational barrel 103 as a rotational motion through a pinion gear 114a formed on the coupling shaft (concave side) 114 and the segment gear 103a. Accompanying this, the holding barrel 104 which holds a focusing optical system 110 is driven in the direction of the optical axis by the function of the helicoid 103b and helicoid 104a.

However, in the conventional autofocus lens barrel which has been described above, a problem is encountered in that the lens barrel using the gear driving makes driving sounds when gears are driven in a site of photographing where people tend to be nervous about any sounds.

Also, there is a problem that due to reactive force given to the sliding portion of the rotational barrel to be driven, efficiency is lowered, and that due to such a lowered efficiency, an uneven operation results from the difference in the positions of the lens barrel, or there is a disadvantage that hunting is generated.

SUMMARY OF THE INVENTION

The present invention is designed in consideration of these problems existing in the conventional art, and it is an object of the present invention to provide an autofocus lens barrel capable of reducing the driving sounds generated at the time of autofocusing. Also, it is another object of the present invention to improve the driving efficiency and to reduce hunting or the resultant effect of the difference in posture by improving the driving efficiency.

In order to solve the above-mentioned problems, there are provided for an autofocus lens barrel according to the present invention, optical system shifting means for shifting a focusing optical system in the direction of the optical axis, a driven pulley rotatively driven around the optical axis to actuate the optical system shifting means, a driving pulley to be driven by receiving a driving force, and a transmission belt for transmitting the driving force of the driving pulley to the driven pulley.

Also, an autofocus lens barrel according to the present invention can be structured so that there are provided optical system shifting means for shifting a focusing optical system in the direction of the optical axis, a driven pulley rotatively driven around the optical axis to actuate the optical system shifting means, a driving pulley to be driven by receiving a driving force, an idler pulley provided at position symmetrical to the driving pulley from the optical axis as its center with the driven pulley between them, and a transmission belt for transmitting the driving force of the driving pulley to the driven pulley and idler pulley.

According to the present invention, it is possible to reduce the noise at the time of driving as compared with the gear driving by performing the belt drive using a belt and pulleys instead of the gear driving. Also, it is possible to reduce the reaction effect of the sliding portion of the part to be driven and enhance its efficiency if there are provided a driving pulley, a driven pulley rotatively driven around the optical axis, an idler pulley provided at position symmetrical to the driving pulley from the optical axis as its center with the driven pulley between them, and a transmission belt for transmitting the driving force of the driving pulley to the driven pulley and idler pulley because in this case couple is exerted symmetrically between points with the optical axis as its center at the time of driving.

Moreover, as efficiency is enhanced to reduce the fitting back-lash, the effect resulting from the difference in posture can be minimized and at the same time, hunting can be reduced. If a timing belt is used for the transmission belt, slippage between the belt and pulleys can be prevented, which will contribute to the further improvement of the efficiency and to the focusing accuracy as well.

DETAILED DESCRIPTION OF THE PREFERRED EMBODIMENTS

Figure 1:
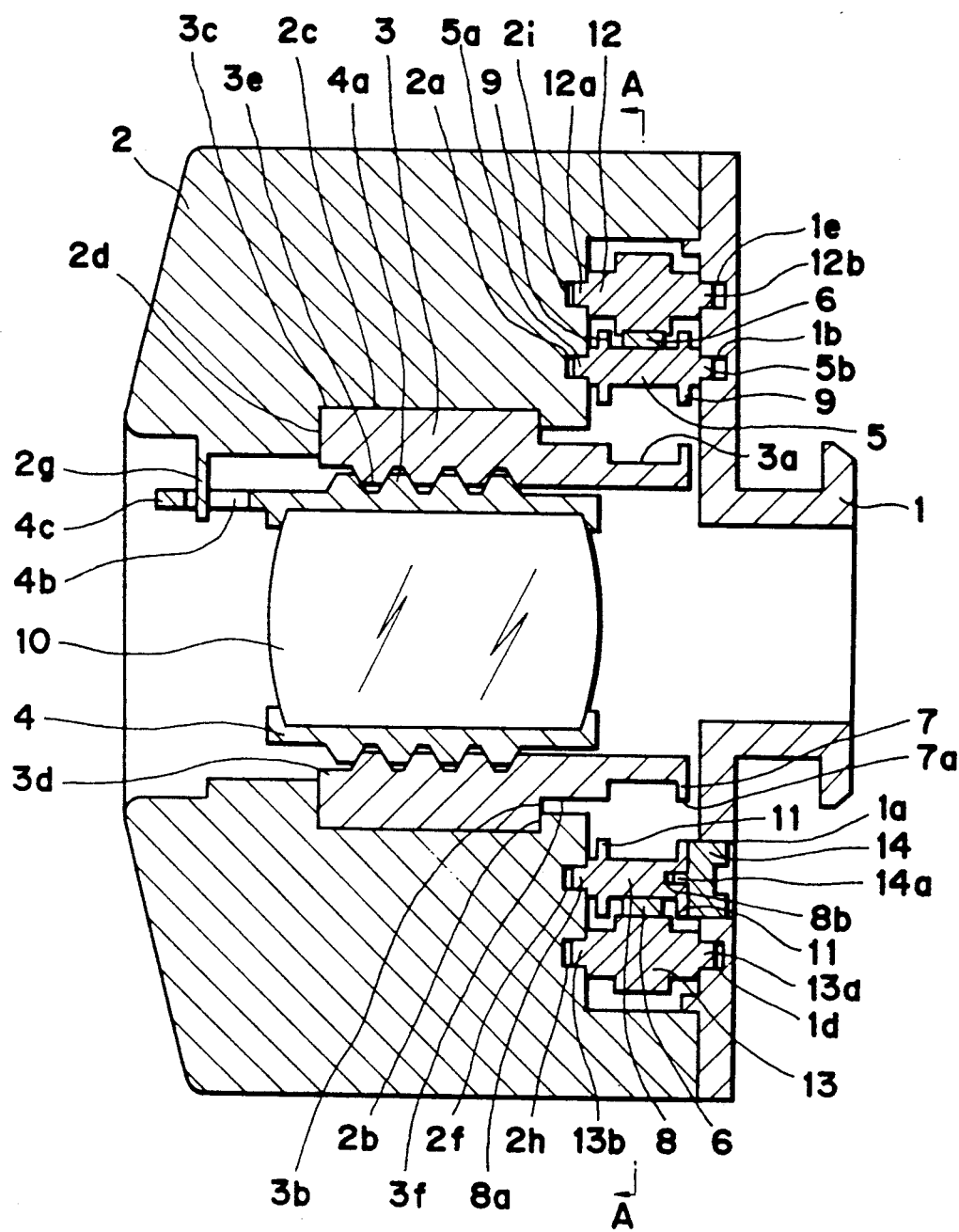
FIG. 1 is a longitudinal section showing an embodiment of an autofocus lens barrel according to the present invention.
Figure 2:
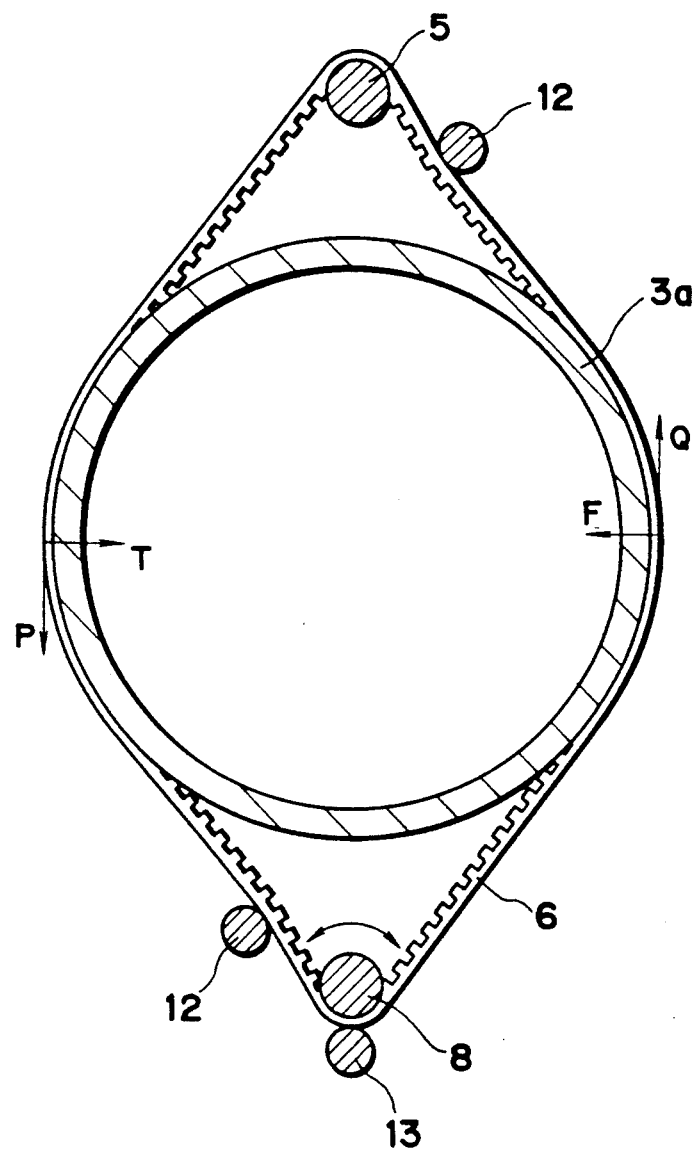
FIG. 2 is a cross-sectional view taken along line A—A in FIG. 1.

Hereinafter, in reference to FIG. 1 and FIG. 2, the description will be made of an embodiment according to the present invention. FIG. 1 is a longitudinal section of an embodiment of an autofocus lens barrel according to the present invention. FIG. 2 is a longitudinal section taken along line A—A in FIG. 1.

In FIG. 1 and FIG. 2, a reference numeral 1 designates a lens mount; 2, a fixed barrel fixed to the lens mount 1; and 3, a rotational barrel (drum) rotatively fitted in the inner periphery of the fixed barrel 2 with the optical axis as its center. On the inner periphery of the rotational barrel 3, a helicoid 3e is formed while on the outer periphery of the lens mount 1 side, a segment pulley 3a is formed. A holding barrel (drum) 4 has the aforesaid helicoid 4a on its outer periphery to engage with the aforesaid helicoid 3e, and further, helds an optical system 10 with its inner periphery.

In the lens mount 1, there is provided a fitting through hole 1a for engaging a coupling (convex, not shown) on the body side, which transmits the driving force generated on the camera body side through a camera body mount (not shown), with a coupling (concave) 14 on the lens side.

Also, a shaft hole 1b is provided at a position symmetrical to the fitting through hole 1a of the lens mount 1 with the optical axis as its center for axially holding the one end 5b of an idler pulley 5. In this respect, at both ends of the aforesaid idler pulley 5, flanges 9 are provided to prevent a timing belt 6 from being off positioned. Further, a shaft hole 1d is provided for axially preventive roller 13 outside the fitting through hole 1a on the prolongation of the optical axis and the aforesaid fitting through hole 1a.

On the inner periphery 2c of the fixed barrel 2, which is fixed to the lens mount 1, a rotational barrel 3 is rotatively fitted in contact therewith through its outer periphery 3c. At the one end of this rotational barrel 3, a segment pulley 3a which engages with the timing belt 6 is provided, and a helicoid 3e is arranged on its inner diameter side. In this respect, the axial shifting of the rotational barrel 3 and the fixed barrel 2 is restricted by the planes 3b and 3d, and the planes 2b and 2d, respectively.

Also, at the right end portion of the fixed barrel 2 in FIG. 1, there are provided a shaft hole 2a for axially holding the other end 5a of the shaft of the idler pulley 5 and a shaft hole 2f for axially holding the one end 8a of the shaft of a driving pulley 8 having flanges 11 at the both ends thereof at the positions symmetrical to the optical axis as its center. Further, a shaft hole 2h is provided outside the shaft hole 2f on the prolongation of the optical axis and the shaft hole 2f for holding the other end 13b of the shaft of the tooth-jump preventive roller 13 axially.

The holding barrel 4 holds the optical system 10 with the inner periphery thereof and also, on its outer periphery, a helicoid 4a is slidably formed to, engage with the helicoid 3e of the rotational barrel 3. On the projection 4c of the holding barrel 4, a linear groove 4b is formed, and in the linear groove 4b, a projection 2g of the fixed barrel 2 is slidably fitted. Therefore, the holding barrel 4 can be shifted only in the direction of optical axis, that is, in the forward and backward directions. The diameter of the segment pulley 3a which is formed on the rotational barrel 3 is made smaller than the face 3f and the diameter 7a of the flange 7 so as not to allow the timing belt 6 to be off positioned from the pulley.

The aforesaid driving pulley 8 follows the rotational movement of the coupling (concave) 14 on the lens side because the projection 14a of the coupling (concave) 14 on the lens side is press fitted into the hole 8b. A tensioner 12 is positioned so that an initial tension can be given to the timing belt 6. A shaft 12a at one end of the tensioner 12 and a shaft 12b at the other end thereof are axially supported by a shaft hole 2i and a shaft hole 1e provided respectively on the fixed barrel 2 and the lens mount 1. In this respect, a pair of tensioners 12 are provided with the optical axis as its center as shown in FIG. 2.

Subsequently, the operation (which is here assumed to be of rotation in the direction indicated by arrows) of an embodiment structured as above will be described as set forth below. The driving force from a driving source (not shown) in the camera body is transmitted to the coupling (concave) 14 on the lens side by the coupling (convex, not shown) on the body side.

The rotational driving force thus transmitted to the coupling (concave) 14 on the lens side is transmitted by intermeshing to the timing belt 6, to which an optimum initial tension is given by the tensioners 12, by the driving pulley 8 integrally formed with the coupling (concave) 14 on the lens side, and further, to the segment pulley 3a and idler pulley 5 formed on the rotational barrel 3, which engage with the timing belt 6.

Here, the intermeshing of the timing belt 6 and the segment pulley 3a formed on the rotational barrel 3 is arranged at two places located asymmetrically with the optical axis as its center, and on the center of each intermeshing, there are exerted as shown in FIG. 2, a tangential force Q in the rotational direction and a tangential force P which is equal to the tangential force Q and in parallel therewith in the opposite direction as well as a force F toward the center of the optical axis and a force T which is equal to the force F in the direction opposite thereto.

Figure 3:
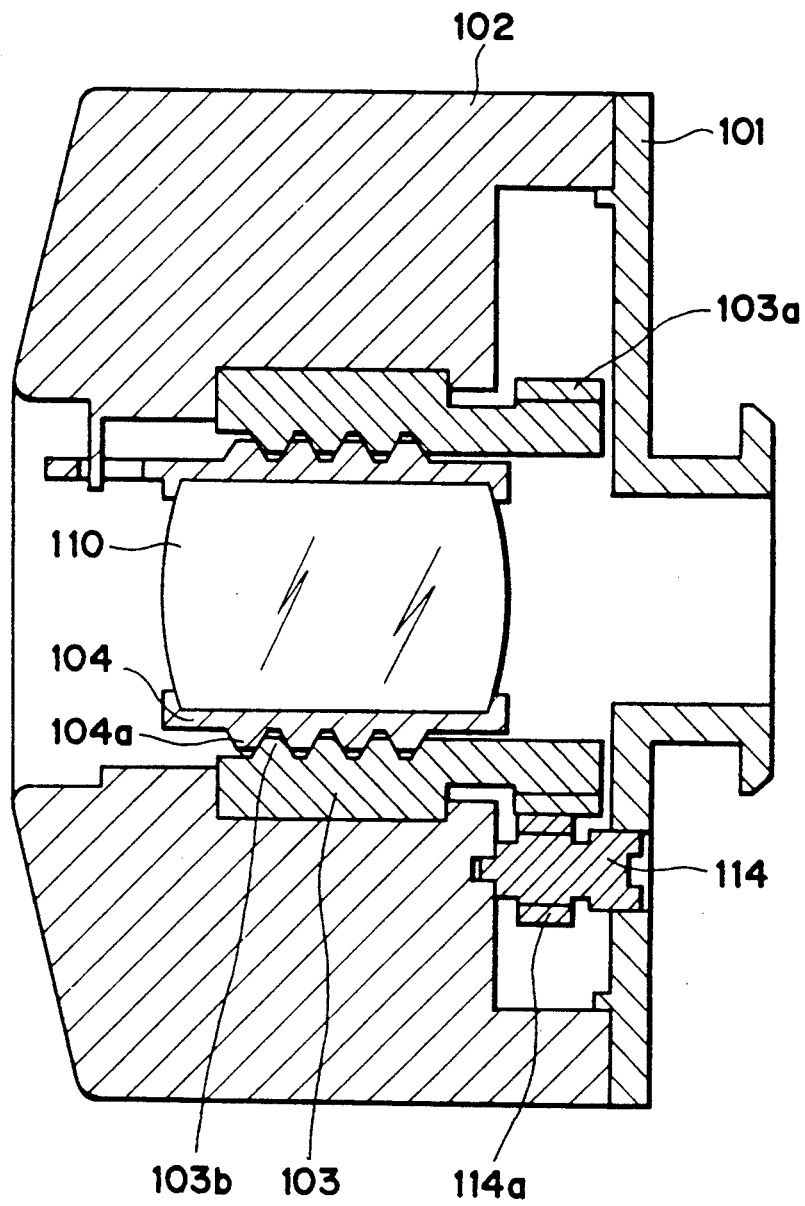
FIG. 3 is a longitudinal section showing an example of a conventional autofocus lens barrel.

Since such a relationship of a driving couple as above is satisfied, no reaction force will be generated as in the case of a gear driving as shown in FIG. 3, which can possibly take place in the fittingly slidable portion between the inner periphery 2c of the fixed barrel 2 and the outer periphery 3c of the rotational barrel 3 which is slidably fitted on the inner periphery 2c.

The rotational barrel 3 having the segment pulley 3a to which the above-mentioned rotational driving force has been transmitted is caused to rotate around the optical axis. Therefore, the helicoid 3e formed on the inner diameter side of the rotational barrel 3 is also allowed to rotate. Thus, the holding barrel 4 having the helicoid 4a which slides by intermeshing with the helicoid 3e can be shifted in the direction of the optical axis to implement an optimal focusing.

Here, in the above-mentioned embodiment, a driving source for generating the driving force is installed in the camera body. However, it may be possible to arrange a structure so that such a driving source can be installed in an autofocus lens barrel provided according to the present invention.

Here, also the description has been made of a case where the lens barrel is mounted on a camera. However, an autofocus lens barrel according to the present invention is applicable to mounting on any other equipment than the camera.

As described above, according to the present invention, the driving sound at the time of driving is reduced as compared with a gear driving, making its user possible in a site of the photographing where people get nervous about any sounds. Also, the effect of reaction from the sliding portion of the driven part is reduced by exerting couple in point symmetry at the time of driving with the optical axis as its center. Hence enhancing efficiency and with such enhanced efficiency, the effect of the fitting back-lash can be reduced to make the effect resulting from the difference in posture small to reduce hunting. As a result, it is possible to perform a focusing operation smoothly. Thus enabling a photographer to concentrate on taking a photography without being sensitive to the focusing operation.

What is claimed is:

1. An autofocus lens barrel comprising:

optical system shifting means for shifting a focusing optical system forward or backward along an optical axis;

a driven pulley rotatively driven around the optical axis for actuating said optical system shifting means, the driven pulley being rotatably seated in a fixed barrel of the lens barrel;

a driving pulley to be driven by receiving a driving force;

an idler pulley provided at a position substantially symmetrical to said driving pulley with respect to the optical axis; and a belt for transmitting the driving force from said driving pulley to said driven pulley and said idler pulley.

2. An autofocus lens barrel according to claim 1, wherein said driven pulley is a part of a first drum engaging with said belt on its outer periphery, and said optical system shifting means includes a helicoid formed on the inner periphery of said first drum, and a second helicoid formed on the outer periphery of a second drum, in which a focusing optical system is fixedly received, to engage with the helicoid of said first drum.

3. An autofocus lens barrel according to claim 1, wherein said belt is abutted against diametrically opposed portions of said driven pulley to provide a driving couple for said driven pulley.

4. An autofocus lens barrel according to claim 1, wherein said barrel further includes a tensioner abutting on said belt for giving an appropriate tension to said belt.

* * * * *